United States Patent
Kiess et al.

(10) Patent No.: US 6,722,183 B2
(45) Date of Patent: Apr. 20, 2004

(54) SYSTEM AND METHOD FOR IMPULSE NOISE SUPPRESSION FOR INTEGRATOR-BASED ION CURRENT SIGNAL PROCESSOR

(75) Inventors: Ronald J. Kiess, Decatur, IN (US); Robert W. Koseluk, Carmel, IN (US); Raymond O. Butler, Jr., Anderson, IN (US); Philip Allen Karau, Grand Blanc, MI (US); Jerral A. Long, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 35 days.

(21) Appl. No.: 10/091,246

(22) Filed: Mar. 4, 2002

(65) Prior Publication Data

US 2003/0164025 A1 Sep. 4, 2003

(51) Int. Cl.$^7$ ................................................ E02L 23/22
(52) U.S. Cl. ..................................... 73/35.08; 73/117.2
(58) Field of Search ........................... 73/35.08, 117.2, 73/117.3; 123/406.37

(56) References Cited

U.S. PATENT DOCUMENTS

| 5,396,176 A | 3/1995 | Ishii et al. ................... 324/388 |
|---|---|---|
| 5,425,339 A | 6/1995 | Fukui .......................... 123/416 |
| 5,534,781 A | 7/1996 | Lee et al. .................... 324/380 |
| 5,694,900 A | 12/1997 | Morita et al. ............... 123/425 |
| 5,755,206 A | 5/1998 | Takahashi et al. .......... 123/425 |
| 5,945,828 A | 8/1999 | Katogi et al. ............... 324/399 |
| 5,979,406 A | * 11/1999 | Aoki et al. ............. 123/406.37 |
| 6,186,129 B1 | 2/2001 | Butler, Jr. .................... 123/620 |

FOREIGN PATENT DOCUMENTS

JP     2001056271     2/2001

OTHER PUBLICATIONS

Motorola High–Speed CMOS Logic Data, Motorola Inc., Series B, 1986, pp. 5–605 to 5–614.

* cited by examiner

Primary Examiner—Richard A. Moller
(74) Attorney, Agent, or Firm—Jimmy L. Funke

(57) ABSTRACT

An impulse noise suppression circuit for an integrator-based ion current signal processing system includes a one-shot circuit activated by a trigger signal that is produced when a noise transient in a bandpass filtered ion current signal exceeds a predetermined threshold. The output pulse of the one-shot circuit is selected to have a pulse width configured to mask a substantial portion of the noise transient without masking the remaining filtered ion current signal during the remainder of a knock window in which knock is detected.

18 Claims, 4 Drawing Sheets

SYSTEM AND METHOD FOR IMPULSE NOISE SUPPRESSION FOR INTEGRATOR-BASED ION CURRENT SIGNAL PROCESSOR

RELATED APPLICATIONS

This application may be related to copending U.S. application Ser. No. 10/091,312, filed on Mar. 4, 2002, entitled "PROCESSING AND INTERFACE METHOD FOR ION SENSE-BASED COMBUSTION MONITOR," attorney docket no. DP-302,882, assigned to the common assignee of the present invention, the benefit of which is hereby claimed, and which contents are incorporated by reference herein.

BACKGROUND OF THE INVENTION

1. Technical Field

This invention relates generally to a system and method for suppressing impulse noise in an ion current processing system of the type useful in connection with controlling ignition in an internal combustion engine.

2. Description of the Related Art

One approach for detecting a combustion condition, such as knock or misfire, involves the use of a so-called ion sense system. It is known that the combustion of an air/fuel mixture in an engine results in molecules in the cylinder being ionized. It is further known to apply a relatively high voltage across, for example, the electrodes of a spark plug just after ignition in order to produce a current between the electrodes. Such current is known as an ion current. The ion current that flows is, generally speaking, proportional to the number of combustion ions present in the area of, for example, the spark plug gap referred to above. Additionally, the level of such ion current may provide some measure of the level of ionization throughout the entire cylinder as combustion occurs. The DC level or amount of ion current is indicative of the quality of the combustion event, or whether in fact combustion has occurred at all (e.g., a misfire condition). An AC component of the ion current may be processed to determine the presence of knock. The ion sense approach is effective for any number of cylinder engines and various engine speed and load combinations.

For example, U.S. Pat. No. 5,534,781 issued to Lee et al. entitled "COMBUSTION DETECTION VIA IONIZATION CURRENT SENSING FOR A 'COIL-ON-PLUG' IGNITION SYSTEM" discloses an ion sense system of the type described above having a ion sense voltage source and an integrator wherein the integrator develops an analog output that is an integrated version of an ion current signal. This analog output is provided to an electronic control unit. In ignition systems of the type disclosed in Lee et al. that utilize the spark plug electrodes for ionization sensing, a problem arises in that impulse noise spikes may be impressed upon the ion current signal as a result of corona partial discharges from the high voltage dielectric materials contained in the ignition system components. For example, insulators in the ignition coil, spark plugs, and spark plug wires. Ignition systems that utilize ion current sensing in order to control combustion "knock" often depend on an integration function, such as described in Lee et al., for processing the knock signal. These systems are adversely affected by the presence of the corona discharge voltage spikes (i.e., impulse noise), which may advance the integrator incrementally upwards, even in the absence of knock, and thereby cause false retard of the spark timing.

One known approach taken in the art for dealing with the above-identified problem involves observing the ion current signal within the integrator window for a high amplitude, relatively short duration burst, which is characteristic of the above-described corona partial discharge phenomenon. When such a signature characteristic is detected, such known system is configured to simply discard or ignore the knock signal for that particular combustion event. Such known approach, however, can be improved upon in as much as in the known system, no data concerning knock is used at all, even though for the most part (other than the abnormal contribution to the knock signal due to the impulse spike), the data can prove useful.

There is therefore a need to provide an improved apparatus for detecting a combustion condition, such as knock, that minimizes or eliminates one or more of the shortcomings as set forth above.

SUMMARY OF THE INVENTION

One object of the present invention is to provide a solution to one or more of the above-identified problems. One advantage of the present invention is that it allows the ability to provide a close-loop knock control system, while eliminating the need for discrete knock sensors and associated harnesses used in conventional systems. Another advantage of the present invention is that it provides an apparatus that provides knock data that will be valid for more, if not all, combustion events, unlike the conventional approach set forth in the Background which discards knock data when impulse noise is detected. A still further advantage of the present invention, in one embodiment, is that it allows mechanization for non-digital processing of a knock intensity signal, which may be located at the ignition coil, and thereafter communicated to an engine control module or the like.

An apparatus according to the present invention includes an ion current detection circuit and a processing circuit. The ion current detection circuit is configured to bias a spark plug in an engine cylinder for producing an ion current signal indicative of an ion current through the spark plug. The processing circuit includes a blanking circuit and an integrator. The blanking circuit is configured to suppress noise transients in the ion current signal. The integrator is configured to integrate the ion current signal that is absent of noise transients to produce an output signal. The output signal is indicative of knock, and in a preferred embodiment, is indicative of a knock intensity.

In a still further preferred embodiment, the processing circuit further includes a bandpass filter configured to filter the ion current signal from the ion current detection circuit. The bandpass is selected so as to pass a predetermined frequency range containing frequency components indicative of a knock condition. The bandpass filtered ion current signal is fed to a rectifier for rectification, and further to a threshold detector for producing a trigger signal when a noise transient exceeds a predetermined threshold. The blanking circuit is responsive to the trigger signal and is configured to suppress the noise transients in the filtered, ion current signal during a knock window.

Other objects, features and advantages of the present invention will become apparent to one skilled in the art from the following detailed description and accompanying drawings illustrating features of this invention by way of example, but not by way of limitation.

DETAILED DESCRIPTION OF THE PREFERRED EMBODIMENTS

Figure 1:
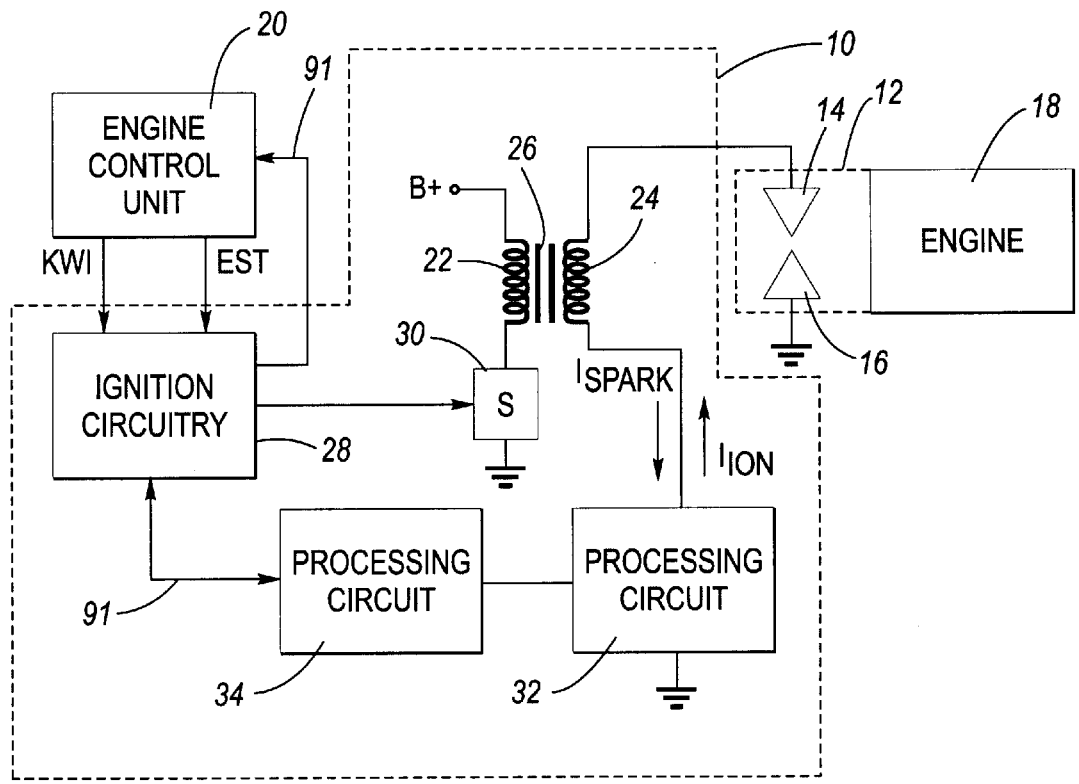
FIG. 1 is a simplified diagrammatic and schematic view of an ignition system for an internal combustion engine including a processing circuit according to the invention.

Referring now to the drawings wherein like reference numerals are used to identify identical components in the various views, FIG. 1 is a simplified schematic and block diagram view of an ignition apparatus 10 having impulse noise suppression according to the invention. Ignition apparatus 10 includes an ion current sensing capability and is adapted for installation to a conventional spark plug 12 having spaced electrodes 14 and 16 received in a spark plug opening of an internal combustion engine 18. As known, the electrodes of spark plug 12 are proximate a combustion cylinder of engine 18.

Apparatus 10 further includes a primary winding 22, a secondary winding 24, a core 26, ignition circuitry 28, a primary switch 30, an ion current detection circuit 32, and an ion current signal processing circuit 34 (first embodiment) having impulse noise suppression capability.

Generally, overall spark timing (dwell control) is provided by an engine control unit (ECU) 20 or the like. Control unit 20, in addition to spark control, may also control fuel delivery, air control and the like. In a global sense, control unit 20 is configured to control overall combustion in engine 18. Control unit 20 may include, for example, a central processing unit (CPU), memory, and input/output, all operating according to preprogrammed strategies.

In addition, engine control unit 20 may be configured to provide a knock window signal designated KWI (i.e., start, end, and duration). The knock window is defined so as to enable or optimize knock detection. Approaches for the generation of the knock window are known in the art (e.g., determined generally based on the engine position or range of positions in which knock is most likely to occur). Alternatively, if a knock window signal is not provided by engine control unit 20, ignition circuitry 28 may be configured to generate a knock window for use by processing circuit 34, for example, as described in copending application entitled "IGNITION COIL INTEGRATED ION SENSE WITH COMBUSTION AND KNOCK OUTPUTS," U.S. application Ser. No. 10/091/247, filed on Mar. 4, 2002, attorney docket no. DP-304,842, assigned to the common assignee of the present invention, and hereby incorporated by reference in its entirety.

A high side end of primary winding 22 may be connected to a supply voltage provided by a power supply, such as a vehicle battery (not shown) hereinafter designated "B+" in the drawings. Supply voltage B+ may nominally be approximately 12 volts. A second end of the primary winding opposite the high side end is connected to switch 30. The high voltage end of secondary winding 24 is coupled to spark plug 12. The opposite end of secondary winding 24 is connected to ion current detection circuit 32.

Ignition circuitry 28 is configured to selectively connect, by way of switch 30, primary winding 22 to ground based on an electronic spark timing signal, for example, provided by engine control unit 20. Such connection, as is generally known in the art, will cause a primary current $I_P$ to flow through the primary winding 22. Switch 30 may comprise conventional components, for example, a bipolar transistor, a MOSFET transistor, or an insulated gate bipolar transistor. Ignition circuitry 28 may be configured to provide additional functions, for example, applying repetitive sparks to the combustion chamber during a single combustion event.

The EST signal referred to above is generated by controlling unit 20 in accordance with known strategies based on a plurality of engine operating parameters as well as other inputs. Dwell control generally involves the control of the timing of the initiation of the spark event (i.e., at a crankshaft position and degrees relative to a top dead center position of a piston in the cylinder) as well as a duration period. The asserted ignition control signal EST is the command to commence charging of the ignition coil for a spark event. After charging, primary winding 22 is disconnected from ground, thereby interrupting the primary current $I_P$. It is well understood by those of ordinary skill in the art of ignition control that such interruption results in a relatively high voltage being immediately established across the secondary winding, due to the collapsing magnetic fields associated with the interruption of the primary current. The secondary voltage will continue to rise until reaching a breakdown voltage across electrodes 16, 14 of spark plug 12. Current will thereafter discharge across the gap (i.e., spark current), as is generally understood in the art. The spark event, as is generally understood by those of ordinary skill in the art, is provided to ignite an air and fuel mixture introduced into the cylinder. During the spark event, a spark current, designated $I_{SPARK}$, flows across spaced electrodes 16, 14. In addition, spark plug 12 is configured so that when biased by a relatively high voltage produced by ion current detection circuit 32, an ion current may be carried across electrodes 14, 16. In the figures, the ion current is designated $I_{ION}$. The magnitude of a DC component of the ion current is indicative of a combustion condition, such as combustion, and/or misfire. In particular, as is known, the greater the ion current (i.e., due to more ionized molecules present in the cylinder), the more complete the combustion. In addition, the presence of an AC component of the ion current is indicative of a knock condition. A first knock mode may be defined based on the magnitude of the AC component of the ion current in a range between approximately 5–6 kHz. Alternatively, a second knock mode may be defined based on a magnitude of the AC component of the ion current in a range between approximately 10–12 kHz. It has been observed that knock will most likely occur at the peak of the ion current, which may be from about 10–15 degrees after TDC.

Ion current detection circuit 32 is configured to perform multiple functions. First, circuit 32 is configured to establish a bias voltage across electrodes 14, 16 for causing an ion current to flow. The structure for performing this function may include any one of a plurality of approaches known in the art. In one embodiment, a zener diode is employed in parallel with the storage capacitor; however, this is exemplary only and not limiting in nature. Circuit 32 is further configured to provide the means for sensing the ion current and for generating in response thereto an ion current signal.

Processing circuit 34 is configured generally to suppress noise transients in the ion current signal provided by circuit 32, and further to integrate such signal and produce an output signal indicative of knock intensity.

Figure 2:
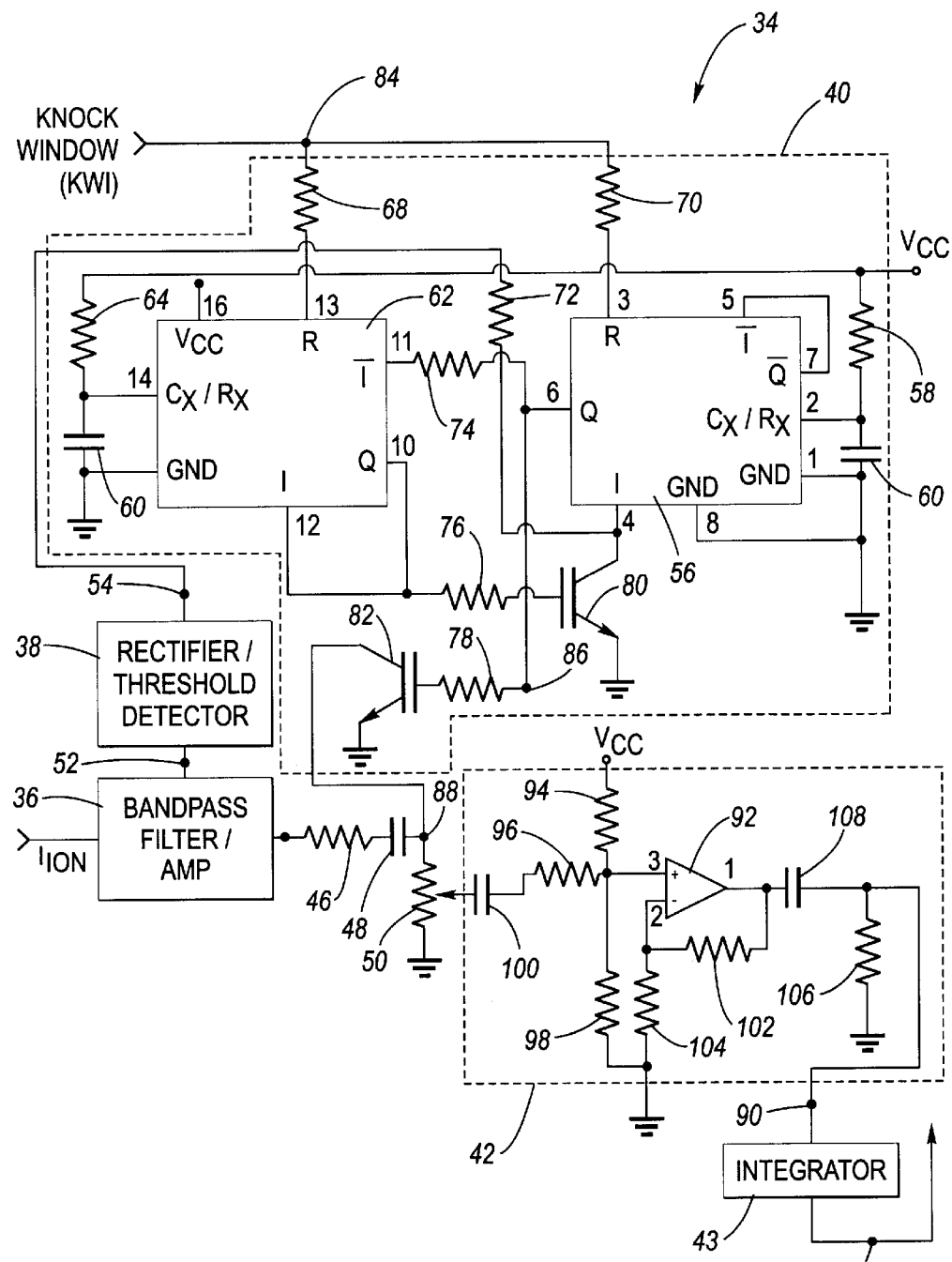
FIG. 2 shows, in greater detail, the processing circuit of FIG. 1.

FIG. 2 is a simplified schematic and block diagram view showing, in greater detail, a first embodiment of the processing circuit 34 of FIG. 1. As used herein with respect to the electrical components in FIG. 2, an exemplary value, as used in a constructed embodiment, will follow parenthetically after the element reference numeral. Processing circuit 34 includes a bandpass filter/amplifier 36, a rectifier/threshold detector 38, a blanking circuit 40, an optional amplifier circuit 42, an integrator 43, and input circuitry comprising a resistor 46 (27 kΩ), a capacitor 48 (47 nF) and a variable resistor 50 (100 kΩ).

Bandpass filter/amplifier circuit 36 is configured to filter the ion current signal $I_{ION}$ to extract knock frequency components. In the illustrated embodiment of FIG. 2, the bandpass filter/amplifier 36 is configured to allow a predetermined frequency range to pass, particularly, the first knock mode mentioned above in the 5–6 kHz range. An output of circuit 36 is produced on an output node 52 with the resulting bandpassed filtered ion current signal being referred to herein as $S_{52}$.

Rectifier/threshold detector 38 is configured to rectify the AC component of the filtered ion current signal, and, additionally, compare the rectified, filtered signal against a predetermined threshold level. The predetermined threshold level is selected so as to correspond to a high amplitude, short duration burst, that is characteristic of a corona partial discharge phenomenon, as described in the Background. This function may be accomplished through the use of conventional components known to those of ordinary skill in the art (e.g., comparator). When such an impulse noise transient is detected, the output of circuit 38 changes logic states from a logic low to a logic high on an output node 54 thereof. The logic signal output from circuit 38 is referred to herein as a trigger signal, whose import will be described in further detail hereinafter.

Figure 3A:
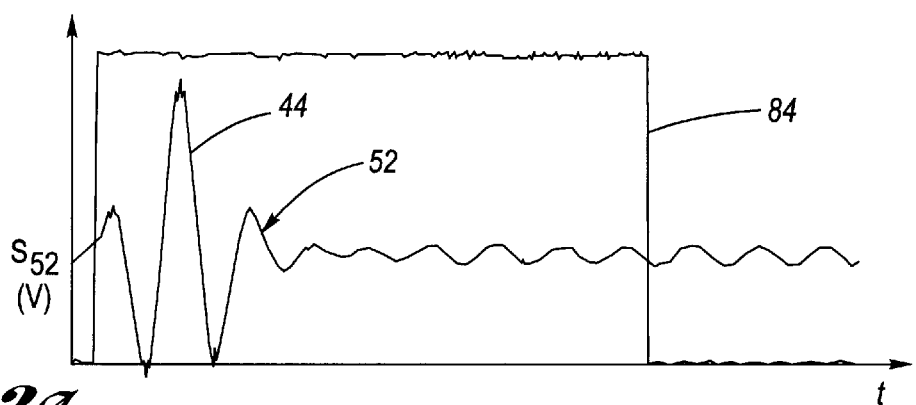
FIGS. 3A–3B are simplified timing diagrams showing a bandpass filtered ion current signal before and after noise suppression according to the invention.

Blanking circuit 40 is responsive to the trigger signal and is configured to suppress noise transients (e.g., noise transient 44 shown in FIG. 3A) in the filtered, ion current signal during a knock window KWI. Blanking circuit 40, in the illustrated embodiment, includes a first monostable multivibrator (one-shot) 56 having a first timing resistor 58 (39 kΩ) and a first timing capacitor 60 (10 nF) associated therewith, a second monostable multivibrator (one-shot) 62 having a second timing resistor 64 (100 kΩ) and a second timing capacitor 66 (47 nF) associated therewith, input resistor 68 (10 kΩ), resistor 70 (10 kΩ), and resistor 72 (10 kΩ), output resistor 74 (10 kΩ), resistor 76 (22 kΩ) and resistor 78 (11 kΩ), and a pair of switches such as NPN bipolar transistors 80 and 82. The knock window referred to above is provided on node 84.

The one-shots 56, and 62 may comprise conventional components, commercially available, and known to those of ordinary skill in the art, such as, for example, a component having model no. 74HC4538 known as a dual retriggerable monostable multivibrator, or similar functionality. In the illustrated embodiment, the numerals without lead lines around the perimeter of each of the one-shot blocks refers to a pin out designation of the HC 4538 chip, and is exemplary only and not limiting in nature.

At times other than during the knock window, the knock window signal KWI, which is applied to the reset inputs ("R") of one-shots 56, and 62, hold the one-shots in a reset, or disabled condition. When the knock window opens, as controlled by the knock window signal KWI on node 84 (e.g., a logic low level transitioning to a logic high level), the one-shots 56, 62 are enabled for operation as further described herein. When transistor 82 is off, which is the normal case since the output "Q" of one-shot 56 is low, the ion current signal passes on to gain control circuitry, at the input of integrator 43 where its level may be set for proper operation of, for example, a knock processor integrated circuit.

The one-shot 56 is initiated or triggered by the trigger signal generated on node 54. An output blanking pulse, which is generated on node 86, is configured to bias transistor 82 into a conductive state, which draws an input node 88 to integrator 43 to ground for the duration of the blanking pulse. Timing components 58, and 60 associated with one-shot 56 are selected so that the blanking pulse 86 is wide enough to blank a substantial portion of an impulse noise transient 44, but not be so wide as to mask all of the knock signal in the knock widow KWI. In one embodiment, for 6 kHz knock signals, blanking pulse 86 is selected to have a pulse width between about 200–250 microseconds.

One-shot 62 produces a pulse that is of a longer duration than one-shot 56, and is triggered by a falling edge of the blanking pulse 86, which turns on clamping transistor 80 to ensure that only one blanking pulse 86 per knock window is produced. This, in-effect, is a fail safe feature so as to ensure that even if the threshold level becomes misadjusted in detector 38, that not all of the knock information available during the knock window is inadvertently blanked or masked by generating multiple blanking pulses. Alternate strategies, of course, may be used (e.g., two blanking pulses per knock window).

With continued reference to FIG. 2, circuit 42 is configured to adjust the level of the filtered, ion current signal that is provided at node 88 for any attenuation due to the filter. Circuit 42 produces an output at node 90 that is an amplified version of its input. Circuit 42 includes an amplifier 92, input resistor 94 (470 kΩ), resistor 96 (10 kΩ) and resistor 98 (100 kΩ), input capacitor 100 (47 nF), feedback and output resistor 102 (100 kΩ), resistor 104 (51 kΩ), resistor 106 (220 kΩ) and capacitor 108 (47 nF). Amplifier 92 may comprise conventional components known to those of ordinary skill in the art, for example, commercially available component having model no. designated TLC272. Circuit 42 is optional.

Integrator 43 is configured to integrate the filtered, ion current signal, as amplified by circuit 42 (if included). The integrator 43 produces an output 91 that is an integrated version of its input, and is indicative of a knock intensity. Integrator 43 may be an analog integrator or a digital integrator, both known. Integrator 43 may be included in processing circuit (as shown), or may be included in ignition circuitry 28.

Figure 3B:
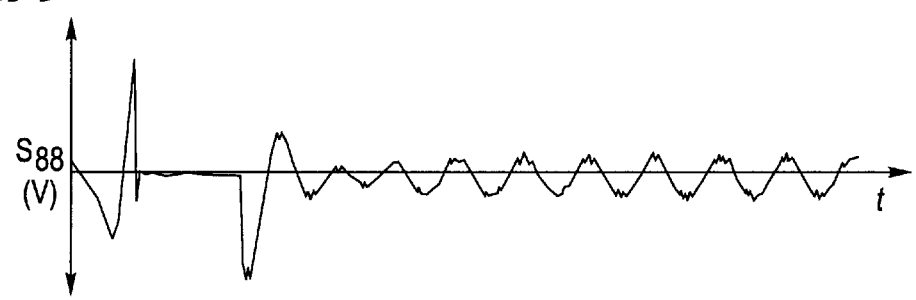
Figure 4A:
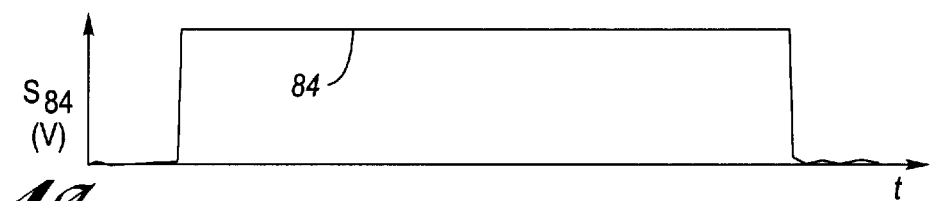
FIGS. 4A–4C are simplified timing diagrams showing an effect of suppressing a noise transient in the knock integrator output during a knock window.
Figure 4B:
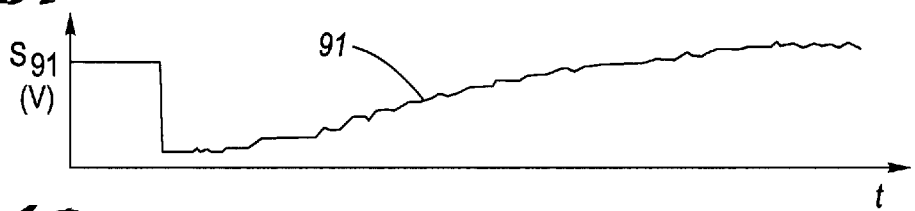
Figure 4C:
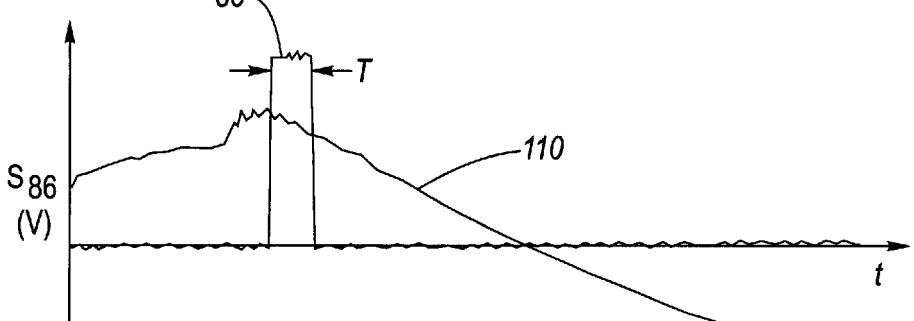

Referring now to FIG. 2, FIGS. 3A–3B, and 4A–4C, the overall operation of an embodiment according to the invention will now be set forth. After sparking has occurred, ion current detection circuit 32 biases spark plug 12 to thereby produce an ion current $I_{ION}$. At a predetermined time, engine control unit 20 produces a knock window signal KWI, which is designated by trace 84 in FIG. 3A. The ion current signal is bandpass filtered by bandpass filter/amplifier 36, and an output thereof is provided on output node 52, which is designated by trace 52 in FIG. 3A. Note, that the signal $S_{52}$ appearing on node 52 includes an impulse noise transient 44. Rectifier/threshold detector 38 detects impulse noise 44 and produces the trigger signal on node 54. The knock window signal shown by trace 84 in FIG. 3A, having already been provided to one-shot circuits 56 and 62, enables the one-shot circuits for operation. Upon receipt of the trigger signal $S_{54}$ by way of resistor 72, one-shot circuit 56 produces a blanking pulse on output node 86. The blanking pulse, shown as trace 86 in FIG. 4C, has a predetermined duration, designated "T" in FIG. 4C, that is selected to mask a substantial part of the impulse noise transient 44, without unduly masking or blanking valid knock information in the remainder of trace 52. The blanking signal shown as trace 86 in FIG. 4C is operative to cause transistor 82 to be placed in a conductive state, which clamps the filtered knock signal on node 88 to ground. When transistor 82 is off, the signal will pass on to the input of integrator 43, as described above. FIG. 3B shows the effect of the clamping action of transistor 82 relative to the signal at node 88. Note, that the scale of FIG. 3B differs somewhat from the scale in FIGS. 4A–4C.

Referring to FIG. 4B, it is shown that the invention causes integrator 43 to effectively hold its output 91 during the blanking pulse 86. FIG. 4C further shows the blanking pulse in relation to a cylinder pressure signal 110 corresponding to the pressure in the cylinder being sensed.

Figure 5:
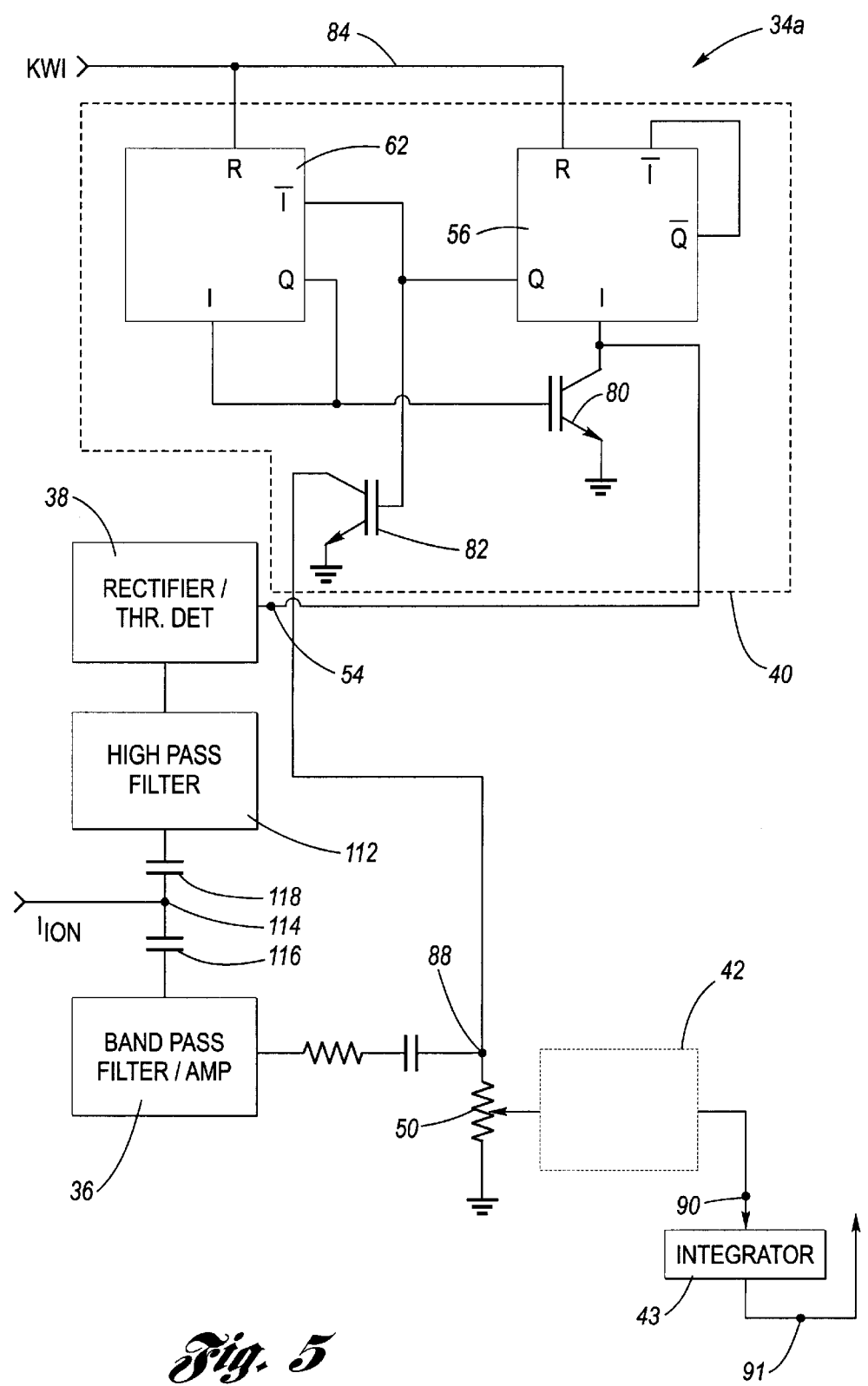
FIG. 5 is a simplified schematic and block diagram view of a preferred embodiment according to the invention.

FIG. 5 shows, in greater detail, a preferred embodiment of processing circuit 34 of FIG. 1, designated circuit 34*a*. Preferred circuit 34*a* is the same as circuit 34 in FIG. 2, except as described below. Circuit 34*a* includes a high pass filter 112, which improves discrimination between a spike and knock, improves response time, and minimizes inadvertent tripping of the one-shot blanking pulse when presented with high amplitude bursts of clean knock signals.

The input $I_{ION}$ to circuit 34*a* is provided to an input node 114. FIG. 5 further shows capacitors 116 and 118. The ion signal $I_{ION}$ is provided to high pass filter 112 (not via bandpass filter 36). The noise impulse generally includes wide band frequency components. Preferably, the cut on frequency is selected to be equal to or higher than the knock mode that may be present in the signal. For example, for a 6 kHz knock mode, the high pass filter preferably has a cut on frequency equal to or greater than 6 kHz. Moreover, the filter may be a first order, second order or third order type filter arrangement. For cut on frequency of about 6 kHz (i e., equal to the knock mode being detected), the order of the filter does not appreciably affect discriminating a spike from knock signals. However, as the cut on frequency is increased (e.g., 8 kHz, 10 kHz, 12 kHz, etc.), the higher the order for filter 112, the greater the discriminating ability to discern a spike from just knock signals, even clean, strong knock signals. This arrangement minimizes occurrence of false trips of the blanking pulse.

The input $I_{ION}$ passes through bandpass filter 36 (as in circuit 34), the output of which is fed to input node 88.

It should be understood that the foregoing is exemplary only and not limiting in nature. For example, integrator 43 may comprise digital integration circuitry, or, in a yet further embodiment, may comprise a circuit having a built-in "hold" function activated by a signal on an input terminal thereof that can be operated directly by the blanking pulse generated by one-shot 56 produced on node 86.

What is claimed is:

1. An apparatus comprising:
   an ion current detection circuit configured to bias a spark plug in an engine cylinder for producing an ion current signal indicative of an ion current through the spark plug; and
   a processing circuit including (i) a blanking circuit configured to suppress noise transients in said ion current signal during a knock window, said blanking circuit is responsive to a trigger signal produced when said noise transient exceeds a predetermined threshold and (ii) an integrator for integrating said ion current signal during said knock window to produce an output signal.

2. The apparatus of claim 1 wherein said blanking circuit is further configured to suppress said ion current signal for a predetermined time.

3. The apparatus of claim 2 wherein said predetermined time is measured relative to said trigger signal.

4. The apparatus of claim 1 wherein said blanking circuit includes:
   a monostable multivibrator responsive to said trigger signal for producing a pulse having a pulse width corresponding to a predetermined time; and
   a switch responsive to said pulse for switching said ion current signal to predetermined voltage for said predetermined time.

5. The apparatus of claim 4 wherein said predetermined voltage comprises a ground reference.

6. The apparatus of claim 5 wherein said monostable multivibrator is further responsive to a knock window signal corresponding to said knock window, said monostable multivibrator being enabled by said knock window signal.

7. The apparatus of claim 6 wherein said monostable multivibrator is a first monostable multivibrator, and said blanking circuit further including a second monostable multivibrator configured to disable said first monostable multivibrator during a remainder of said knock window after said pulse has been produced.

8. The apparatus of claim 7 wherein said processing circuit includes a bandpass filter configured to filter said ion current signal.

9. The apparatus of claim 8 wherein said filter allows a predetermined frequency range to pass and is provided to said integrator.

10. The apparatus of claim 9 wherein said processing circuit further includes a rectifier configured to rectify said bandpass filtered ion current signal.

11. The apparatus of claim 10 further including a threshold detector responsive to said rectified, bandpass filtered ion current signal for producing said trigger signal.

12. The apparatus of claim 11 wherein said processing circuit further includes a high pass filter responsive to said ion current signal.

13. The apparatus of claim 12 wherein said high-pass filter has a preselected cut on frequency that is equal to or greater than a preselected knock mode.

14. The apparatus of claim 13 further including a rectifier configured to rectify said high pass filtered ion current signal, and a threshold detector responsive to said filtered, rectified ion current signal for producing said trigger signal.

15. An apparatus comprising:
   an ion current detection circuit configured to bias a spark plug in an engine cylinder after a spark during a combustion event for producing an ion current signal indicative of an ion current through the spark plug; and
   a processing circuit including (i) a bandpass filter configured to filter said ion current signal; (ii) a blanking circuit responsive to a trigger signal configured to suppress noise transients in said filtered, ion current signal during a knock window, said trigger signal being produced when said noise transients exceeds a predetermined threshold; and (iii) an integrator for integrating said filtered, ion current signal during said knock window to produce an output signal.

16. The apparatus of claim 15 wherein said blanking circuit is further configured to suppress said ion current signal for a predetermined time after said trigger signal is produced.

17. A method of determining a knock condition comprising the steps of:
- (A) generating an ion current signal;
- (B) filtering said ion current signal to extract knock components;
- (C) suppressing a first noise transient in the filtered ion current signal during a knock window when said first noise transient exceeds a predetermined threshold to produce a conditioned signal; and
- (D) integrating said conditioned signal during said knock window to produce an output signal indicative of the knock condition.

18. The method of claim 17 wherein said suppressing step includes the substep of:
generating a blanking pulse when the noise transient exceeds the predetermined threshold.

* * * * *